United States Patent [19]

Snyder

[11] Patent Number: 5,630,095
[45] Date of Patent: May 13, 1997

[54] METHOD FOR USE WITH A DATA COHERENCY PROTOCOL ALLOWING MULTIPLE SNOOP QUERIES TO A SINGLE SNOOP TRANSACTION AND SYSTEM THEREFOR

[75] Inventor: Michael D. Snyder, Austin, Tex.

[73] Assignee: Motorola Inc., Schaumburg, Ill.

[21] Appl. No.: 497,815

[22] Filed: Jul. 3, 1995

Related U.S. Application Data

[63] Continuation of Ser. No. 100,942, Aug. 3, 1993, abandoned.

[51] Int. Cl.$^6$ .................................................. G06F 12/00
[52] U.S. Cl. ..................... 395/473; 395/500; 395/450; 365/49
[58] Field of Search ........................ 395/500, 306, 395/450, 493, 427, 448, 473; 365/49

[56] References Cited

U.S. PATENT DOCUMENTS

| | | | |
|---|---|---|---|
| 5,025,365 | 6/1991 | Mathur et al. | 395/600 |
| 5,072,369 | 12/1991 | Theus et al. | 395/425 |
| 5,148,533 | 9/1992 | Joyce et al. | 395/425 |
| 5,228,136 | 7/1993 | Shimizu et al. | 395/425 |
| 5,249,283 | 9/1993 | Boland | 395/473 |
| 5,283,882 | 2/1994 | Smioth et al. | 395/49 |
| 5,297,269 | 3/1994 | Donaldson et al. | 395/425 |
| 5,303,362 | 4/1994 | Butts, Jr. et al. | 395/448 |
| 5,313,609 | 5/1994 | Baylor et al. | 395/448 |
| 5,319,766 | 6/1994 | Thaller et al. | 395/425 |
| 5,353,415 | 10/1994 | Wolford et al. | 395/306 |
| 5,375,216 | 12/1994 | Moyer et al. | 395/450 |
| 5,497,480 | 3/1996 | Hayes et al. | 395/493 |

OTHER PUBLICATIONS

1990 IEEE Publication titiled "an on–chip 72K pseudo two–port cache memory subsystem".
IEEE publication titled "multistage bus network (MEN)".

*Primary Examiner*—Robert B. Harrell
*Assistant Examiner*—Saleh Najjar
*Attorney, Agent, or Firm*—Lee E. Chastain

[57] ABSTRACT

A method for use with a data coherency protocol has the steps of receiving a bus transaction in a data processor from a bus, receiving a first response from a memory location, generating a first protocol signal, receiving a second response from the memory location, generating a second protocol signal and outputting either the first or second protocol signal responsive to the coherency protocol. The data processor operates at a clock frequency at least twice as fast as the bus. The data processor can query its memories at least twice and receive at least two responses during a single cycle of the bus clock. Therefore, the data processor can ignore busy responses from the memories that occur before the end of the single bus clock cycle.

2 Claims, 5 Drawing Sheets

METHOD FOR USE WITH A DATA COHERENCY PROTOCOL ALLOWING MULTIPLE SNOOP QUERIES TO A SINGLE SNOOP TRANSACTION AND SYSTEM THEREFOR

This application is a continuation of prior application Ser. No. 08/100,942, filed on Aug. 3, 1993, entitled "METHOD FOR USE WITH A DATA COHERENCY PROTOCOL AND SYSTEM THEREFOR", (original title), now abandoned.

FIELD OF THE INVENTION

The present invention generally relates to digital computing systems, and more specifically to data processors that operate according to a data coherency protocol.

BACKGROUND OF THE INVENTION

Data processing systems sometimes incorporate data coherency protocols to coordinate data operations between different subsystems. A multi-processor data processing system (an MP system) is a system that uses such a data coherency protocol. In an MP system, each data processor in a group of data processors stores a subset of the system's memory in an associated one of a group of memory caches. The data processors periodically load data from the system's main memory system into the associated memory cache and vice versa. Each data processor can modify the data in its memory cache independent of every other data processor. Without some coherency scheme, the data stored in the common memory subsystem would become hopelessly confused as each data processor modified its subset of the memory without consideration of every other data processor's actions.

Cache memory systems are only one example of devices that use data coherency protocols. Generally, any system that can store the same data in two or more locations can benefit from a data coherency protocol. The "data" need not be stored in a memory cache. For instance, the data could describe the translation of a particular group of virtual addresses to a corresponding group of effective addresses. This type of data is typically stored in a special purpose table within each data processor.

A memory coherency scheme defines a set of data states and 'set of data operations that modify the data states in a predetermined order. Each memory byte, half-word, word, etc. is assigned a state and data describing the state accompanies the data when ever it is loaded into or out of a memory system. Typically, the states define what fights a particular data processor has with the respect to the data and whether or not the data itself is valid. These rights may include or exclude the data processor's fight to modify the data. Each data processor broadcasts any operation that could modify the state of a piece of data. The broadcast contains information identifying the data and the operation the data processor intends to perform on the data. Conversely, each of the other data processors monitors these broadcasts for operations that might change the state of data stored in each of the other data processors. This procedure is known as "snooping." The other data processors can then modify their relevant data states when necessary or assert a signal temporarily suspending a broadcast operation pending some requisite operation.

A data processor must query each of its coherent memories each time it snoops a data operation. As described above, these coherent memories may be cache memory subsystems, specialized tables or input and output queues to either the cache memory subsystems or the specialized tables. These coherent memories will respond to the data processor indicating whether they contain a copy of the snooped data and the data state associated with the data. However, sometimes the coherent memory systems are unable to answer the query in the time allotted them. In this case, the data processor will assert a response forcing the broadcasting data processor to retry the operation at a later time when the data processors will re-query their coherent memories. Bus bandwidth is degraded when a snooping data processor forces another data processor to rebroadcast a data operation at a later time. Therefore, the number of false rebroadcast signals should be minimized.

SUMMARY OF THE INVENTION

In accordance with the present invention, there is disclosed a method for use with a data coherency protocol which substantially eliminates disadvantages of methods.

A method for use with a data coherency protocol has the steps of receiving a bus transaction in a data processor from a bus, receiving a first response from a memory location, generating a first protocol signal, receiving a second response from the memory location, generating a second protocol signal and outputting either the first or second protocol signal responsive to the coherency protocol. The data processor operates at a clock frequency at least twice as fast as the bus. The data processor can query its memories at least twice and receive at least two responses during a single cycle of the bus clock.

In addition, a system for use with a data coherency protocol has decode circuitry, select circuitry and latching circuitry. The decode circuitry receives a bus transaction from a bus and a memory response signal from a memory subsystem. The three circuitries operate at a clock frequency at least twice as fast as the bus. Therefore, the decode circuitry generates a snoop response responsive to the bus transaction, the memory response signal and a coherency protocol for each cycle of its clock cycle that occurs during a single bus clock cycle. The select circuitry generates a control signal responsive to the first occurrence of a first predetermined snoop response. The latching circuitry selectively stores a snoop response or a previously stored snoop response responsive to the control signal for each cycle of its clock signal that occurs during the single bus clock cycle. The latching circuitry also outputs the latched snoop response at a predetermined time.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
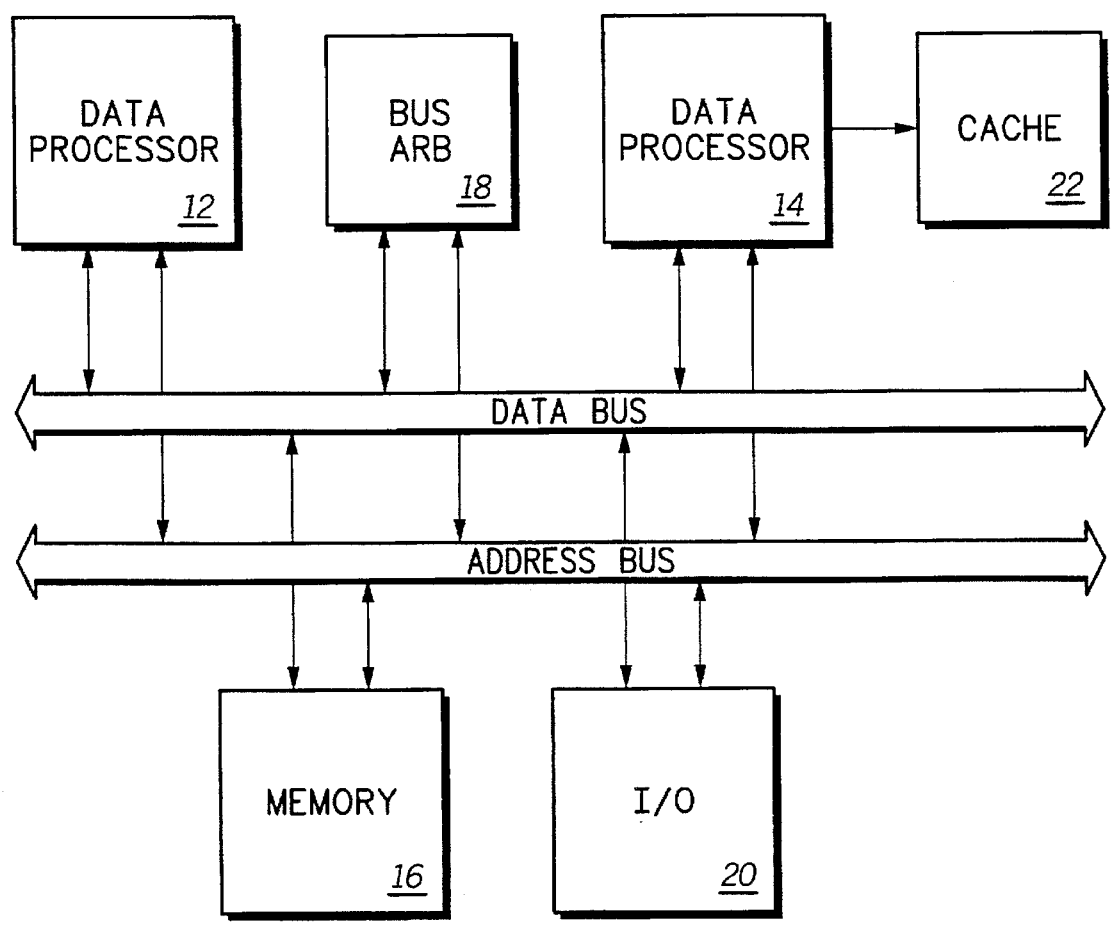
FIG. 1 depicts a block diagram of a data processing system constructed in accordance with the present invention.

FIG. 1 depicts a block diagram of a multi-processor (MP) data processing system 10 constructed in accordance with the present invention. Data processing system 10 has a first data processor block 12, a second data processor block 14, a main memory block 16, a bus arbitration block 18 and an input/output block 20 (labeled and hereafter I/O) interconnected via an address bus and a data bus. As depicted, second data processor block 14 has an external cache memory block 22. Data processing system 10 uses a data coherency protocol to ensure that data stored in two or more locations maintains the same value in both locations. Therefore, data processor blocks 12 and 14 snoop the address bus for transactions that effect data coherency. Data processor blocks 12 and 14 are clocked with a periodic clock signal (P-CLOCK, not shown) that is faster than the clock signal used to clock the associated address and data buses (B-CLOCK, not shown). In general, the ratio of the P-CLOCK to the B-CLOCK is N:1 where N is an integer greater than one. Data processor blocks 12 and 14 are able to query their coherent memories up to N times during a snoop operation. Therefore, data processor blocks 12 and 14 infrequently require the snoop operation to be retried due to a busy response from one of their coherent memories.

Many of the functions of the blocks depicted in FIG. 1 are known in the art. Data processor blocks 12 and 14 execute instructions stored in main memory block 16 using data stored in main memory block 16 and received through I/O block 20. I/O block 20 may provide an interface from data processing system 10 to a keyboard, a disk drive, an electronic network, etc. Bus arbitrator block 18 receives requests from the other various blocks of data processing system 10 for exclusive use of the data and or address buses. Bus arbitrator block 18 grants these requests according to a protocol not relevant to the disclosed invention. Data processor block 14 stores frequently used data in cache block 22.

Figure 2:
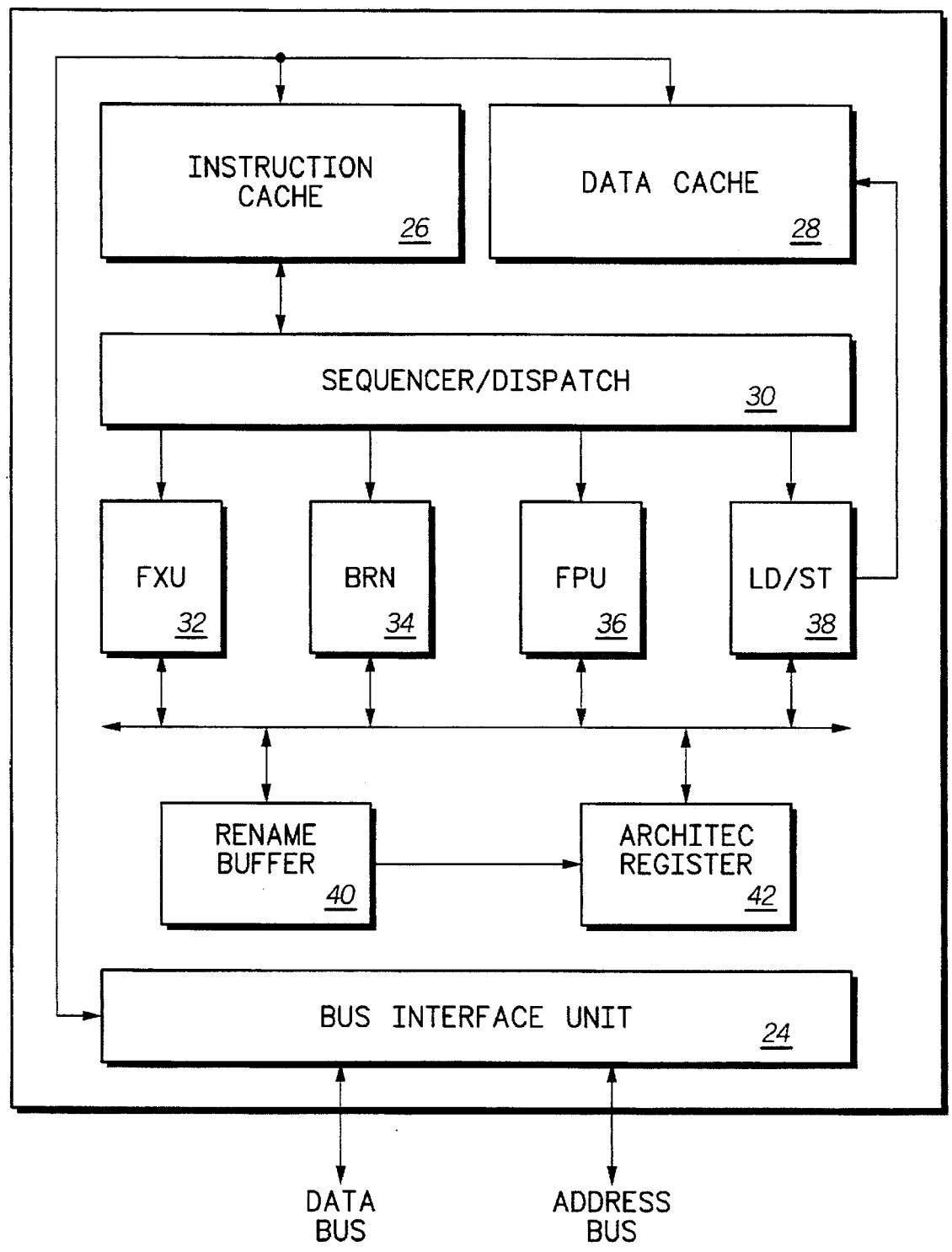
FIG. 2 depicts a block diagram of the data processor block depicted in FIG. 1.

FIG. 2 depicts a block diagram of data processor block 12 depicted in FIG. 1. A bus interface unit (hereafter BIU) block 24 controls the flow of data between data processor block 12 and the address and data buses. BIU block 24 is connected to an instruction cache block 26 and to a data cache block 28. Instruction cache block 26 supplies an instruction stream to sequencer/dispatch block 30. Sequencer/dispatch block 30 forwards individual instructions to an appropriate execution unit block. Data processor block 12 has a fixed point execution unit block 32 (labeled FXU), a branch execution unit block 34 (labeled BRN), a floating point execution unit block 36 (labeled FPU), and a load/store execution unit block 38 (labeled LD/ST). These execution unit blocks are connected to a rename buffer block 40 and to architectural register block 42.

The operation of data processor block 12 without a data coherency protocol is known in the art. In general, sequencer/dispatch block 30 issues individual instructions to the various execution units 32 through 38. Each of the execution units performs one or more instructions of a particular class of instructions. The particular class of instructions of each execution unit is indicated by the name of the execution unit. For instance, branch execution unit block 34 executes branch instructions. Execution unit blocks 32 through 38 return the results of their operations to designated entries in rename buffer block 40. Rename buffer block 40 updates the values in architectural register block 42 according to a known protocol not relevant to the present invention. Rename buffer block 40 and architectural register block 42 supply operands to execution unit blocks 32 through 38.

The operation of data processor block 12 with a data coherency protocol is described below in connection with FIGS. 3 through 5. In general, the data coherency architecture in BIU block 24 is responsible for monitoring all bus address tenures on the address bus, querying all internal coherent memory states, and forming a proper response to the address tenure. These three actions occur during an Address Tenure Snoop Window (hereafter ATSW), a Snoop Valid Window (hereafter SVW), and an Address Retry Window (hereafter ARW), respectively. Each of these three windows is one B-CLOCK cycle in duration. As described above, BIU block 24 operates at a clock frequency a certain integer times faster than the clock frequency of the address and data buses. BIU block 24 may form a proper response during each of the several processor clock cycles occurring during the SVW and determine which response is its correct response. Therefore, BIU block 24 infrequently requires the bus master to retry a particular bus operation.

Figure 3:
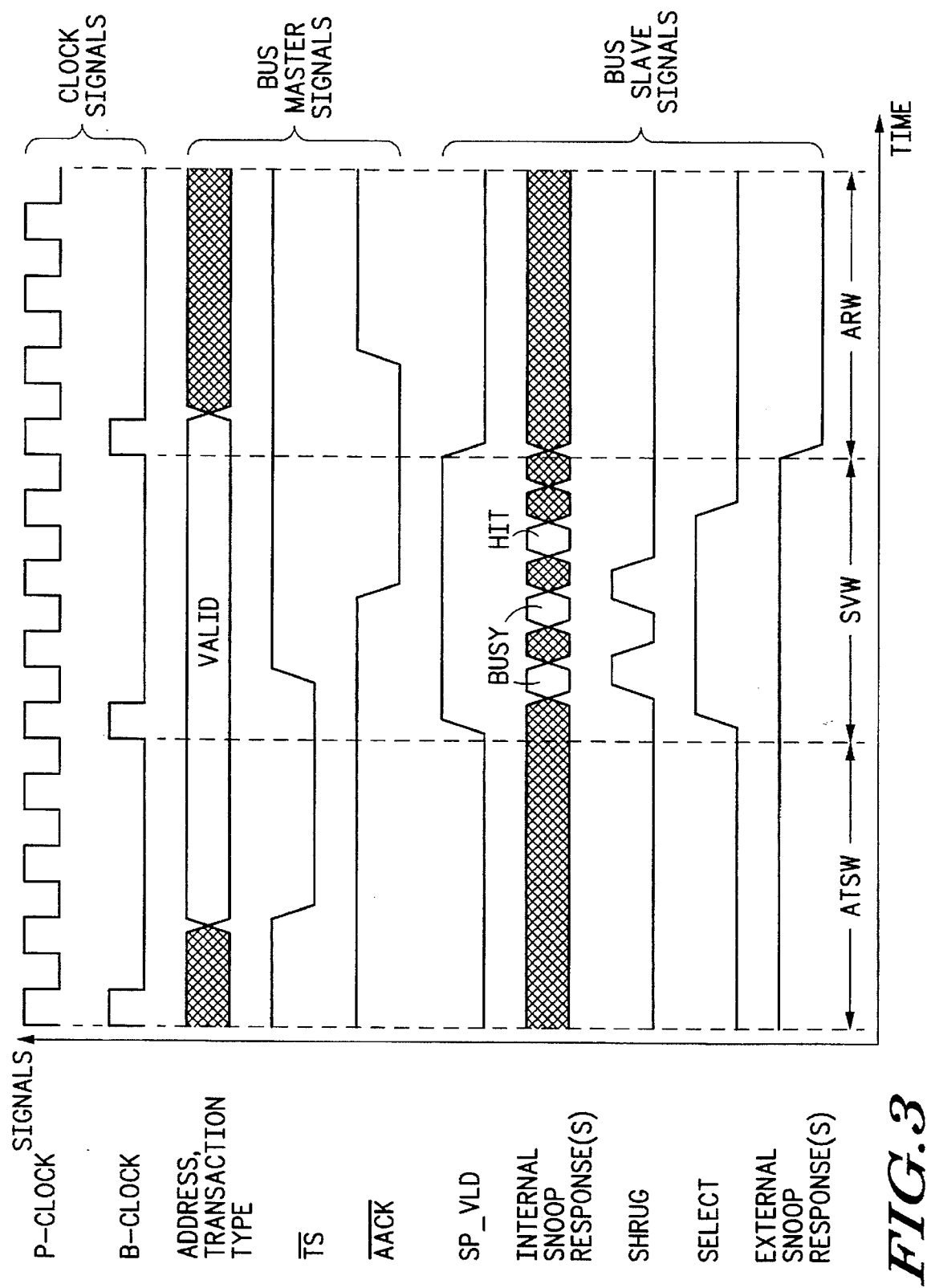
FIG. 3 depicts a timing diagram of a set of control signals operable to implement the disclosed invention.

FIG. 3 depicts a timing diagram of a set of control signals operable to implement the disclosed invention. In this depicted embodiment, the ratio of the frequency of the processor clock (P-CLOCK) to the frequency of the address and data bus clock (B-CLOCK) is 4:1. It should be understood that the disclosed invention may be implemented in data processing systems in which the ratio of P-CLOCK to B-CLOCK is 2:1 or greater. Furthermore, it is not a requirement of the disclosed invention that the ratio of P-CLOCK to B-CLOCK be an integer ratio. A ratio of 2:1 or greater ensures that BIU block 24 has at least two opportunities to generate a response to a snoop operation.

Prior to the events depicted in FIG. 3, one block depicted in FIG. 1 becomes the bus master of the address and data buses. For purposes of illustrating the disclosed invention, second data processor block 14 may be assumed to request ownership of the address and data buses. Typically, a subsystem acquires ownership of a bus by asserting a particular control signal connected to bus arbitrator block 18. Such a signal may be called BUS_REQUEST or the like. Bus arbitrator block 18 grants ownership of the buses to a subsystem according to some protocol not relevant to the disclosed invention. This protocol may evaluate such factors as the prior use of the bus by the various subsystem blocks and the relevant importance of the requesting subsystem block to the overall performance of the system. Bus arbitrator block 18 grants ownership of the bus to second data processor block 18 by asserting a signal uniquely associated with second data processing block 14. Such a signal may be called BUS_GRANT or the like. Second data processor block 18 maintains ownership of the bus by asserting another control signal during the duration of its use of the buses. This control signal may be called BUS_BUSY or the like.

Continuing with FIG. 3, second data processor block 14 begins a data coherency operation once it owns the address bus by simultaneously asserting a transfer start signal (labeled $\overline{TS}$, consistent with standard naming conventions, an active low signal is indicated with a bar) and broadcasting the address and transaction type (labeled ADDRESS, TRANSACTION TYPE) on the address bus. The address identifies a bit, byte, half-word, word, etc. (genetically a block) of data on which the bus master desires to perform some operation. A data coherency operation is any operation that affects the data state of the data block. Every other data processor block in data processing system 10 monitors or "snoops" the address bus for transactions that modify the data state of data blocks stored in memory locations in every other data processor block (internal data caches, specialized tables, pipeline queues, etc.) or in memory locations controlled by every other data processor block (external caches, etc.). In this example, first data processor block 12 monitors the address bus for data coherency operations of second data processor block 14. It should be understood that other devices may snoop the address or data buses. Second data processor block 14 indicates the end of its address and transaction type transfer in the following cycle by asserting an address acknowledge signal (labeled $\overline{AACK}$).

First data processor block 12 asserts an internal snoop valid signal (labeled SP_VLD) during the SVW of a data coherency operation. The snoop valid signal may be further qualified by a snoop valid signal generated by the bus master, here second data processor block 14. Such a signal from the bus master may be called a GLOBAL SNOOP signal (not shown) and would indicate whether the other subsystems in a data processing system should snoop an associated data coherency transaction. First data processor block 12 latches the address and transaction type information coincident with the beginning of the SVW.

First data processor block 12 queries its coherent memories during each P-CLOCK cycle while SP_VLD is asserted. In this example, first data processor block 12 can query its coherent memories four times. As described above, this is N-1 more queries per SVW than can known snoop protocols, where N is the ratio of the frequency of the P-CLOCK to the frequency of the B-CLOCK. The coherent memories respond to BIU block 24 during the second half of each P-CLOCK cycle with an INTERNAL SNOOP RESPONSE(S). (Oftentimes, the logical values of a signal are undefined or irrelevant. These conditions are indicated by a cross-hatched region.) BIU block 24 generates one or more EXTERNAL SNOOP RESPONSE(S) from the INTERNAL SNOOP RESPONSE(S) according to a data coherency protocol. In the illustrated example, the coherent memory is busy during the first and second P-CLOCK cycles. A cache memory system may generate such a busy signal if all the read ports to the cache are in use by other parts of the data processor block. In the third P-CLOCK cycle, the coherent memory responds indicating a "hit." As in the cache memory field, a hit means the snooped address is present in the coherent memory. In the preferred embodiment, the hit signal also indicates the data state of the snooped address.

BIU block 24 generates an internal SHRUG signal and an internal SELECT signal for each coherent memory response it receives.

An asserted SHRUG signal indicates that BIU block 24 can ignore or "shrug-off" a particular INTERNAL SNOOP RESPONSE(S) and the corresponding EXTERNAL SNOOP RESPONSE(S) in the next P-CLOCK cycle. BIU block 24 can shrug-off a particular snoop response in the next P-CLOCK cycle if all previous responses in the SVW were busy and if the instant response is a busy response. A de-asserted SHRUG signal indicates that BIU block 24 must broadcast the EXTERNAL SNOOP RESPONSE(S) corresponding to a particular INTERNAL SNOOP RESPONSE (S).

An asserted SELECT signal indicates that BIU block 24 must latch the present coherent memory response. (BIU block 24 may latch either the INTERNAL SNOOP RESPONSE(S) or the corresponding EXTERNAL SNOOP RESPONSE(S). The depicted embodiment latches the EXTERNAL SNOOP RESPONSE(S).) A de-asserted SELECT signal indicates that BIU block 24 must hold the coherent memory response from a previous P-CLOCK cycle. The signal SELECT is also a function of the signal SP_VLD. The signal SELECT is always asserted during the first P-CLOCK cycle of each SVW and is always de-asserted during the ATSW and the ARW.

BIU block 24 latches each EXTERNAL SNOOP RESPONSE(S) it generates until it no longer generates a SHRUG signal. BIU block 24 ignores all INTERNAL SNOOP RESPONSE(S) and their corresponding EXTERNAL SNOOP RESPONSE(S) after it fails to generate the signal SHRUG for the first time. BIU block 24 outputs its last latched EXTERNAL SNOOP RESPONSE(S) at the beginning of the ARW.

In the example depicted in FIG. 3, the coherent memories within first data processor block 12 return a hit response in the third P-CLOCK cycle of the SVW. This response is not a busy response. BIU block 24 must communicate this response to the bus master, second data processor block 14. BIU block 24 does not generate a SHRUG signal for the hit response. Therefore, BIU block 24 does not latch the response (cross-hatched area) returned to it in the fourth P-CLOCK cycle. BIU block 24 would not latch this last response even if it was a busy response. BIU block 24 broadcasts the EXTERNAL SNOOP RESPONSE(S) generated from the hit signal during the ARW (corresponding to a low logic state).

Figure 4:
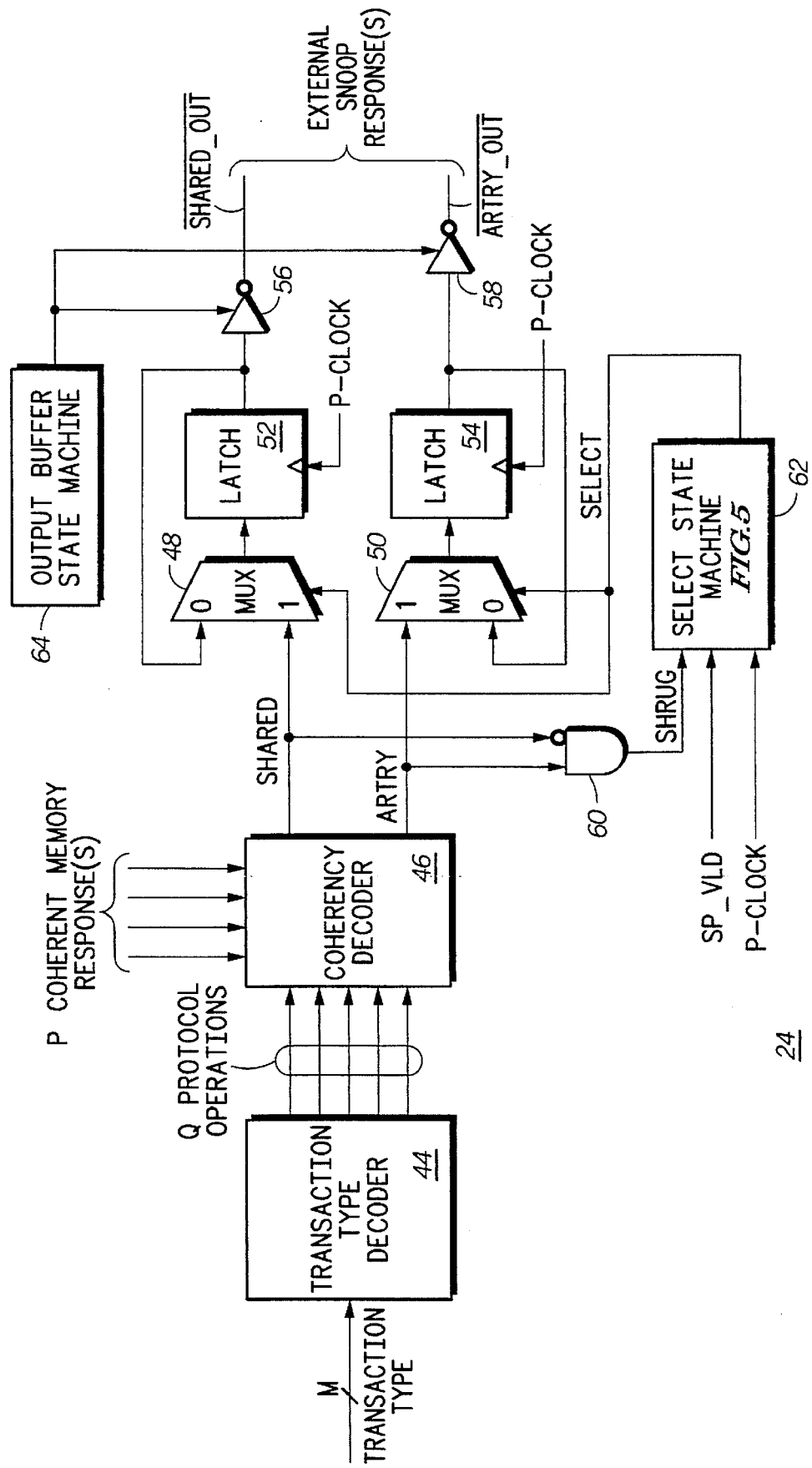
FIG. 4 depicts a block diagram of a portion of the bus interface unit block depicted in FIG. 2.

FIG. 4 depicts a block diagram of a portion of the bus interface unit block 24 depicted in FIG. 2. As described above, BIU block 24 receives M TRANSACTION TYPE input bits, P COHERENT MEMORY RESPONSES and the SP_VLD signal, where M and P are integers. BIU block 24 generates the set of EXTERNAL SNOOP RESPONSE(S) that are broadcast to the bus master. The M TRANSACTION TYPE input bits, the P COHERENT MEMORY RESPONSES and the EXTERNAL SNOOP RESPONSE(S) signals broadcast by BIU block 24 depend upon the data coherency protocol used by data processing system 10 and are not necessarily part of the disclosed invention.

The bus master provides the TRANSACTION TYPE signal to all subsystems connected to the address bus to indicate what data operation the bus master desires to perform upon the data specified by the associated ADDRESS signal.

The coherent memories within first data processor block 12 generate the COHERENT MEMORY RESPONSES. In the depicted embodiment, there are four possible responses from the coherent memories for each address supplied by the bus master: hit-modified exclusive, hit-unmodified exclusive, hit-shared, and busy. These responses are described below in connection with FIGS. 6 through 10.

In the depicted embodiment, data processing system 10 uses two signals, shared and address retry (labeled $\overline{SHARED\_OUT}$ and $\overline{ARTRY\_OUT}$, respectively), to implement its data coherency protocol. These two signals generate four possible pairs of output signals: (1) If $\overline{SHARED\_OUT}$=1 and $\overline{ARTRY\_OUT}$=1, then the data processor block does not contain the coherent data identified by the bus master with the signal ADDRESS. The slave has no objection to the data operation in this case; (2) If $\overline{SHARED\_OUT}$=1 and $\overline{ARTRY\_OUT}$=0, then the data processor block was not able to determine if it contains the coherent data identified by the slave master with the bus signal ADDRESS. This is the busy condition described above. The slave requires the master to abort its data operation and try again at some later time. The slave will re-query its coherent memories at that later time and attempt to generate response number one, three or four. This combination is always generated if a coherent memory responds with a busy signal; (3) If $\overline{\text{SHARED\_OUT}}$=0 and $\overline{\text{ARTRY\_OUT}}$=1, then the data processor block contains the coherent data identified by the slave master with the bus signal ADDRESS. In this case, the slave has no objection to the data operation; (4) If $\overline{\text{SHARED\_OUT}}$=0 and $\overline{\text{ARTRY\_OUT}}$=0, then the data processor block contains the coherent data and the data state of the data requires that the slave first return the data to the data processing system at the next opportunity. The particular conditions that generate each one of the four possible combinations are described below in connection with FIGS. 6 through 10.

Continuing with FIG. 4, a TRANSACTION TYPE DECODER block 44 receives the TRANSACTION TYPE input bits. TRANSACTION TYPE DECODER block 44 converts the received transaction type information into one of Q different data protocol operations, where Q is an integer. The number and type of different data protocol operations is a function of the data protocol implemented by data processing system 10. In the depicted embodiment, there are five different data protocol operations: clean, flush, kill, read and write. These operations are more fully described below in connection with FIGS. 6 through 10.

A COHERENCY DECODER block 46 receives the PROTOCOL OPERATION signals from TRANSACTION TYPE DECODER block 44 and the COHERENT MEMORY RESPONSES from the coherent memories in first data processor block 12. COHERENCY DECODER block 46 generates the internal signals SHARED and ARTRY according to the data protocol used by data processing system 10. In the depicted embodiment, COHERENCY DECODER block 46 is implemented as a programmable logic array (PLA). The particular output vector for each input vector is more fully described below in connection with FIGS. 6 through 10.

The internal signals SHARED and ARTRY are connected to a one's input of a first multiplexer 48 and to a one's input of a second multiplexer 50, respectively. An output of multiplexer 48 and an output of multiplexer 50 are connected to the an input of a latch 52 and to an input of a latch 54, respectively. Latches 52 and 54 are clocked by the P-CLOCK. An output of latch 52 is connected to a zero's input of multiplexer 48 and to an input of an inverting output buffer 56. An output of latch 54 is connected to a zero's input of multiplexer 50 and to an input of an inverting output buffer 58. An output of inverting output buffer 56 generates the signal $\overline{\text{SHARED\_OUT}}$. An output of inverting output buffer 58 generates the signal $\overline{\text{ARTRY\_OUT}}$.

An output of an AND gate 60 generates the signal SHRUG. A first input of AND gate 60 receives the internal signal ARTRY. A second input of AND gate 60 receives a logical complement of the internal signal SHARED. The signals SHRUG and SP_VLD are connected to a SELECT STATE MACHINE block 62. SELECT STATE MACHINE block 62 generates the signal SELECT. The signal SELECT is connected to the control inputs of multiplexers 48 and 50. When SELECT corresponds to a logic state one, multiplexers 48 and 50 pass the inputs connected to their one's input. When SELECT corresponds to a logic state zero, multiplexers 48 and 50 pass the inputs connected to their zero's input. SELECT STATE MACHINE block 62 is described below in connection with FIG. 5.

An OUTPUT BUFFER STATE MACHINE block 64 controls inverting output buffers 56 and 58. OUTPUT BUFFER STATE MACHINE block 64 has two possible states. In the first state, OUTPUT BUFFER STATE MACHINE block 64 forces inverting output buffers 56 and 58 into a high impedance state. In the second state, OUTPUT BUFFER STATE MACHINE block 64 allows inverting output buffers 56 and 58 to assert their respective output signals if the respective outputs of latches 52 and 54 are asserted. Otherwise, inverting output buffers 56 and 58 remain in a high impedance state. OUTPUT BUFFER STATE MACHINE block 64 is in the first state during the ATSW and the SVW. OUTPUT BUFFER STATE MACHINE block 64 is in the second state during the ARW.

Figure 5:
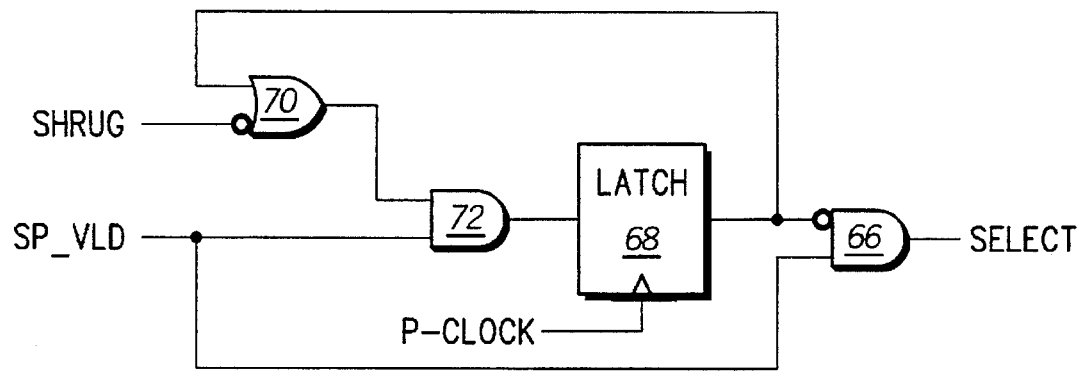
FIG. 5 depicts a block diagram of the SELECT state machine block depicted in FIG. 4.

FIG. 5 depicts a block diagram of SELECT STATE MACHINE block 62 depicted in FIG. 4. SELECT STATE MACHINE block 62 has two possible states. In the first state, SELECT STATE MACHINE block 62 forces multiplexers 48 and 50 to pass their input signals connected to their zero's inputs. In the second state, SELECT STATE MACHINE block 62 forces multiplexers 48 and 50 to pass their input signals connected to their one's inputs. SELECT STATE MACHINE block 62 is placed in the first state when the signals SHRUG and SP_VLD correspond to a logic state zero and one, respectively. SELECT STATE MACHINE block 62 remains in the first state while the signal SP_VLD corresponds to a logic state one. SELECT STATE MACHINE block 62 is placed in the second state when the signal SP_VLD corresponds to a logic state zero. SELECT STATE MACHINE block 62 remains in the second state while the signal SHRUG corresponds to a logic state one.

An output of an AND gate 66 generates the signal SELECT. A first input of AND gate 66 receives the logical complement of an output of a latch 68. A second input of AND gate 66 receives the signal SP_VLD. The output of latch 68 is also connected to a first input of a NOR gate 70. A second input of NOR gate 70 receives the logical complement of the signal SHRUG. An output of NOR gate 70 is connected to a first input of an AND gate 72. A second input of AND gate 72 receives the signal SP_VLD. An output of AND gate 72 is connected to the input of latch 68.

FIGS. 6 through 10 depict state diagrams illustrating a data coherency protocol used in one embodiment of the disclosed invention. This data coherency protocol attributes one of four data states to every coherent memory location in a data processing system: (1) modified exclusive ("M"), (2) unmodified exclusive ("E"), (3) shared ("S"), and (4) Invalid ("I"). (BIU block 24 never asserts either output signal in an invalid data state case nor changes the data state of a snooped address from invalid to some other data state.) This protocol is known in the art as a "MESI" protocol (pronounced messy). The depicted data protocol also characterizes every bus transaction that modifies these data states as one of five operations: (1) clean, (2) flush, (3) kill, (4) read, or (5) write. Each operation modifies the data state according to the data protocol.

As described above, the coherent memories may respond as busy if they are unable to determine if they contain data associated with a snooped address. Also, the coherent memories may respond with a busy signal if they cannot allow a transaction to occur. For instance, a first data processor block may have just obtained exclusive ownership of a data block with the intent of writing to it. In this case, it would be inefficient to allow a second data processor block to modify the data before the first data processor block finished its operation. Instead, the first data processor can assert a buy signal stopping the second data processor block's transaction and finish its own write operation.

Figure 6:
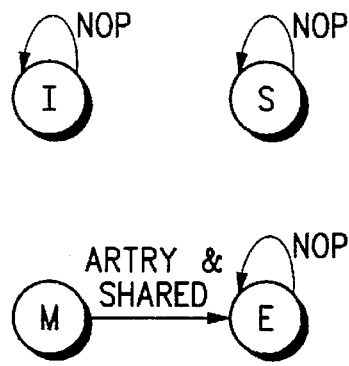
FIGS. 6 through 10 depict state diagrams illustrating a data coherency protocol that may be used with the disclosed invention.

FIG. 6 depicts a state diagram of the clean operation in a MESI data coherency protocol. A bus transaction characterized as a clean operation forces all data processors in a data processing system to copy modified data back to the main memory system. In one embodiment of the disclosed invention, data processor block 12 snoops two instructions that are characterized as clean operations: clean and read with no intent to cache. If BIU block 24 receives a PROTOCOL OPERATION signal corresponding to a clean operation and a COHERENT MEMORY RESPONSE signal corresponding to a hit-modified exclusive, then it will assert both ARTRY and SHARED. BIU block 24 will write its copy of the data associated with the snooped address back to main memory in the following address tenure. Then, BIU block 24 will change the data state of the snooped data from modified exclusive to unmodified exclusive. If the COHERENT MEMORY RESPONSE signal corresponds to a hit-unmodified exclusive or a hit-shared, then BIU block 24 will assert neither output signal (indicated as a no operation or NOP). In these latter two cases, BIU block will not change the data state of the snooped data.

Figure 7:
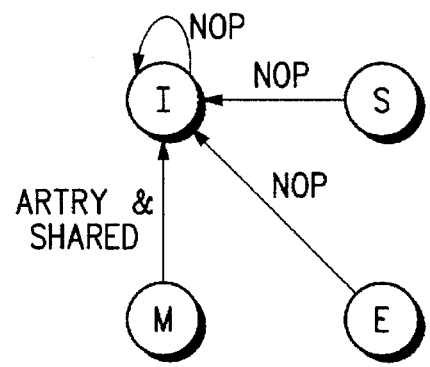

FIG. 7 depicts a state diagram of the flush operation in a MESI data coherency protocol. A bus transaction characterized as a flush operation forces all data processors in a data processing system to copy modified data back to the main memory system and to invalidate any copies of the snooped data. In one embodiment of the disclosed invention, data processor block 12 snoops one instruction that is characterized as a flush operation: flush. If BIU block 24 receives a PROTOCOL OPERATION signal corresponding to a flush operation and a COHERENT MEMORY RESPONSE signal corresponding to a hit-modified exclusive, then it will assert both ARTRY and SHARED. BIU block 24 will write its copy of the data associated with the snooped address back to main memory in the following address tenure. Then, BIU block 24 will change the data state of the snooped data from modified exclusive to invalid. If the COHERENT MEMORY RESPONSE signal corresponds to a hit-unmodified exclusive or a hit-shared, then BIU block 24 will assert neither output signal (indicated as a no operation or NOP). In these latter two cases, BIU block 24 also changes the data state of the snooped data to invalid.

Figure 8:
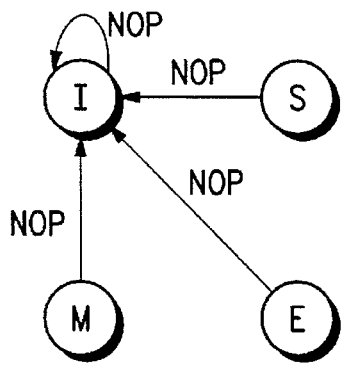

FIG. 8 depicts a state diagram of the kill operation in a MESI data coherency protocol. A bus transaction characterized as a kill operation forces all data processors in a data processing system to invalidate snooped data. In one embodiment of the disclosed invention, data processor block 12 snoops two instructions that are .characterized as kill: kill and write-with-kill. If BIU block 24 receives a PROTOCOL OPERATION signal corresponding to a kill operation and any COHERENT MEMORY RESPONSE signal other than busy, then it will assert neither EXTERNAL MEMORY RESPONSE(S). BIU block 24 will change the data state of the snooped data to invalid.

Figure 9:
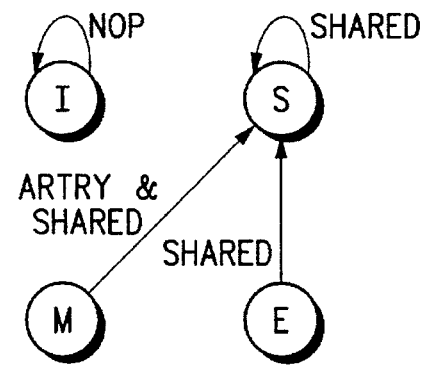

FIG. 9 depicts a state diagram of the read operation in a MESI data coherency protocol. A bus transaction characterized as a read operation forces all data processors in a data processing system to copy modified data back to the main memory system and to relinquish ownership of snooped data. In one embodiment of the disclosed invention, data processor block 12 snoops two instructions that are characterized as read operations: read and read-atomic. If BIU block 24 receives a PROTOCOL OPERATION signal corresponding to a read operation and a COHERENT MEMORY RESPONSE signal corresponding to a hit-modified exclusive, then it will assert both ARTRY and SHARED. BIU block 24 will write its copy of the data associated with the snooped address back to main memory in the following address tenure. Then, BIU block 24 will change the data state of the snooped data from modified exclusive to shared. If the COHERENT MEMORY RESPONSE signal corresponds to a hit-unmodified exclusive or a hit-shared, then BIU block 24 will assert the signal SHARED. BIU block 24 will change the data state from unmodified exclusive to shared in the first of these two cases. Otherwise, data marked as shared data remains shared.

Figure 10:
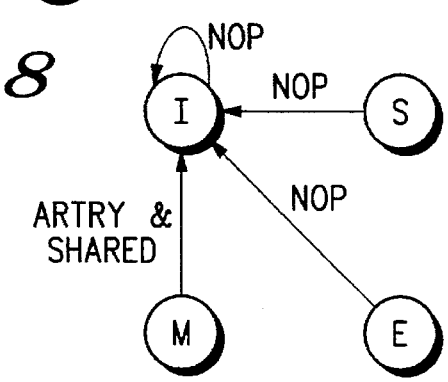

FIG. 10 depicts a state diagram of the write operation in a MESI data coherency protocol. A bus transaction characterized as a write operation forces all data processors in a data processing system to copy modified data back to the main memory system and to invalidate any copies of the data. In one embodiment of the disclosed invention, data processor block 12 snoops four instructions that are characterized as a write operation: read-with-intent-to-modify, read-with-intent-to-modify-atomic, write-with-flush, and write-with-flush-atomic. If BIU block 24 receives a PROTOCOL OPERATION signal corresponding to a write operation and a COHERENT MEMORY RESPONSE signal corresponding to a hit-modified exclusive, then it will assert both ARTRY and SHARED. BIU block 24 will write its copy of the data associated with the snooped address back to main memory in the following address tenure. Then, BIU block 24 will change the data state of the snooped data from modified exclusive to invalid. If the COHERENT MEMORY RESPONSE signal corresponds to a hit-unmodified exclusive or a hit-shared, then BIU block 24 will assert neither output signal (indicated as a no operation or NOP). In these latter two cases, BIU block also changes the data state of the snooped data to invalid.

Although the present invention has been described with reference to a specific embodiment, further modifications and improvements will occur to those skilled in the art. For instance, the disclosed invention is described using a MESI data coherency protocol. This protocol is only exemplary of one embodiment. It is to be understood therefore, that the invention encompasses all such modifications that do not depart from the spirit and scope of the invention as defined in the appended claims.

What is claimed is:

1. A method of maintaining data coherency in a data processing system, the data processing system comprising a bus and a plurality of subsystems coupled to the bus, the bus operating at a first clock frequency, at least a first one of the plurality of subsystems operating at a second clock frequency, a ratio of the second clock frequency to the first clock frequency greater than or equal to two, the method comprising the steps of:

receiving a single bus transaction in the first one of the plurality of subsystems from a second one of the plurality of subsystems, the bus transaction comprising a data address;

generating a snoop response to the single bus transaction for each cycle of the second clock cycle occurring during a first interval, the first interval coincident with a predetermined cycle of the first clock signal, each step of generating a snoop response comprising the steps of:

querying a memory location with the single bus transaction to determine if the memory location comprises data indexed by the data address;

generating a first signal responsive to the querying step;

saving one of an Nth pair of signals responsive to a data coherency protocol during an Nth cycle of the second clock signal occurring during the first interval, the Nth pair of signals comprising the snoop response generated during the Nth cycle of the second clock signal occurring during the first interval and the snoop response generated during an Mth cycle of the second clock signal occurring during the first interval, where N and M are integer indices and where M is less than N and where N is greater than or equal to 2; and outputting a saved one of the Nth pair of signals to the second one of the plurality of subsystems.

2. A system for use with a data coherency protocol comprising:

decode circuitry receiving a single bus transaction from a bus and a memory response signal from a memory subsystem, the decode circuitry generating a snoop response responsive to the single bus transaction, to the memory response signal and to a coherency protocol, the decode circuitry operating at a first clock frequency, the bus operating at a second clock frequency, the ratio of the first clock frequency to the second clock frequency greater than or equal to two, the decode circuitry generating the snoop response each cycle of the first clock cycle occurring during a predetermined cycle of the second clock signal for the single bus transaction, the single bus transaction comprising a memory address and an operation to be performed upon a data block indexed by the memory address, the memory response representative in a first logic state of an inability to determine a presence or an absence of a data word associated with the memory location in the memory subsystem;

select circuitry receiving the snoop response generated by the decode circuitry, the select circuitry initially generating a control signal corresponding to a first logic state, the select circuitry generating a control signal corresponding to a first logic state at the beginning of the predetermined cycle of the second clock signal, the select circuitry generating the control signal corresponding to a second logic state responsive to a first occurrence of a first predetermined snoop response; and latching circuitry receiving the snoop response generated by the decode circuitry and receiving the control signal generated by the select circuitry, the latching circuitry selectively storing the snoop response or a previously stored snoop response, the latching circuitry storing the snoop response responsive to the first logic state of the control signal, the latching circuitry storing the previously stored snoop response responsive to the second logic state of the control signal, the latching circuitry outputting the latched snoop response at a predetermined time to the bus.

* * * * *